Figure 1:
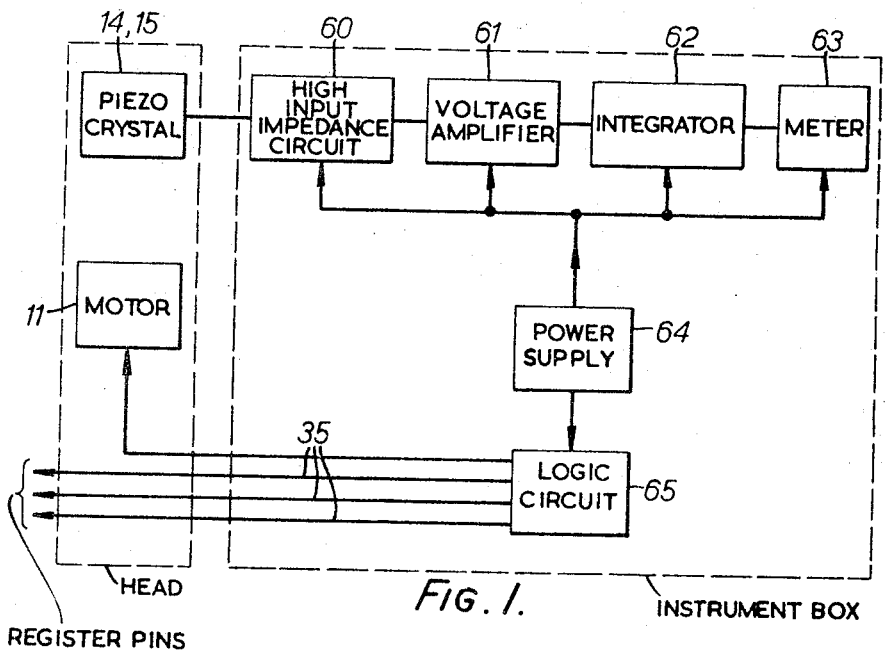

May 23, 1967

D. C. GOODEY 3,320,799

SURFACE TESTING APPARATUS

Filed Jan. 20, 1964

4 Sheets-Sheet 1

INVENTOR
DAVID CHARLES GOODEY
BY
Irvin S. Thompson
ATTORNEY

May 23, 1967  D. C. GOODEY  3,320,799
SURFACE TESTING APPARATUS
Filed Jan. 20, 1964  4 Sheets-Sheet 4

INVENTOR
DAVID CHARLES GOODEY
BY
Irvin S. Thompson
ATTORNEY

3,320,799
SURFACE TESTING APPARATUS
David Charles Goodey, Hampton Hill, Middlesex, England, assignor to Wilmot-Breeden Limited, Birmingham, England
Filed Jan. 20, 1964, Ser. No. 338,665
Claims priority, application Great Britain, Jan. 18, 1963, 2,401/63
11 Claims. (Cl. 73—105)

This invention relates to surface testing apparatus, and in particular to means for measuring surface roughness to provide an indication of the surface finish obtained on an article.

Instruments for measuring surface roughness are in use in which a measuring head is traversed or "stroked" manually over the surface, the head incorporating a stylus which deflects as a result or surface irregularities and produces an electrical signal which is suitably amplified to operate indicating means which can, if desired be calibrated directly in terms of surface roughness. The necessity for hand traversing of the head introduces a human error as the indication is to some extent dependent upon the speed and frequency of reciprocation, and it is difficult to maintain a uniform traversing action whilst at the same time observing the reading of the indicator.

The object of the invention is to provide for such an instrument a measuring head in which the aforesaid human error is eliminated.

The invention consists broadly in surface testing apparatus comprising a head including a movable carrier member carrying a transducer arranged to engage the surface under test, driving means for rotating or oscillating the carrier member, and indicating means responsive to the output of the transducer for indicating the degree of smoothness of the surface.

Preferably a self-contained drive is provided and this is conveniently in the form of an electric motor mounted in the head and directly coupled to a rotatable carrier member. The transducer is preferably connected to a stylus which is conveniently arranged at a small radius from the center of rotation, for example, such radius being 0.25 centimetre, and this not only enables the stylus accurately to follow small radius curves but makes the point of measurement much more definite so that, in effect, the roughness of a chosen spot can be measured.

According to a preferred feature of the invention the carrier member is movable towards and away from the surface, and is spring urged towards the surface. Thus when used on a contoured surface the carrier provides a datum level or mean position about which the stylus operates.

To ensure that the head is seated properly on the surface to be inspected it incorporates registration members, and each such member may be associated with an electrical circuit which must be operated before the drive motor can be energised. Thus the carrier and transducer assembly cannot be rotated to produce a resultant output signal unless the head is firmly seated on the surface.

A further advantage arising from the invention is that the head can be placed on the surface to be measured whatever the position and orientation of that surface, whereas with earlier arrangements it has been necessary to arrange the article being inspected so that the surface concerned is suitably positioned. In the past this has necessitated the provision of special fixtures, for example to hold a motor vehicle bumper which can be of a rather awkward shape. It will also be appreciated that by moving the head on the surface into different attitudes and watching the changes in the indicator reading it is possible to ascertain the direction in which the surface "grain" runs.

Figure 3:
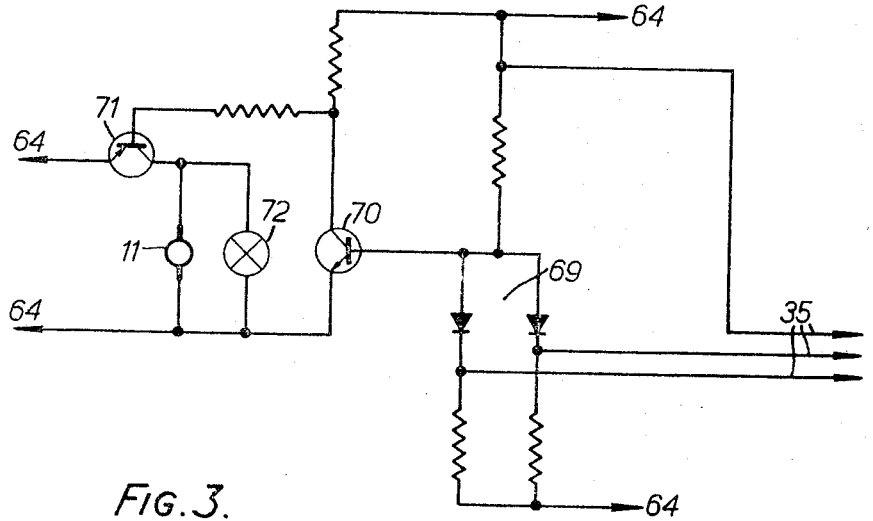
Figure 2:
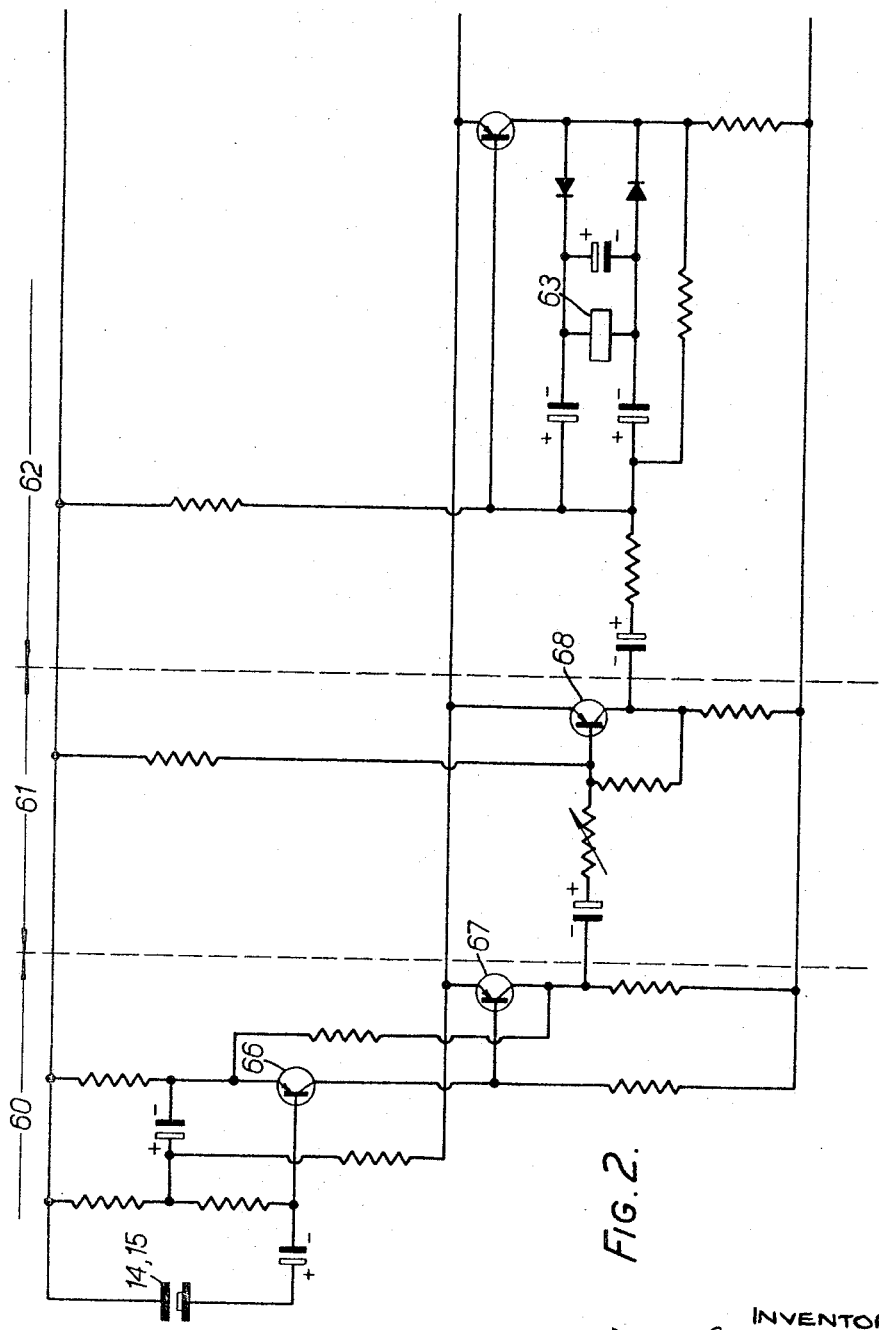
Figure 4:
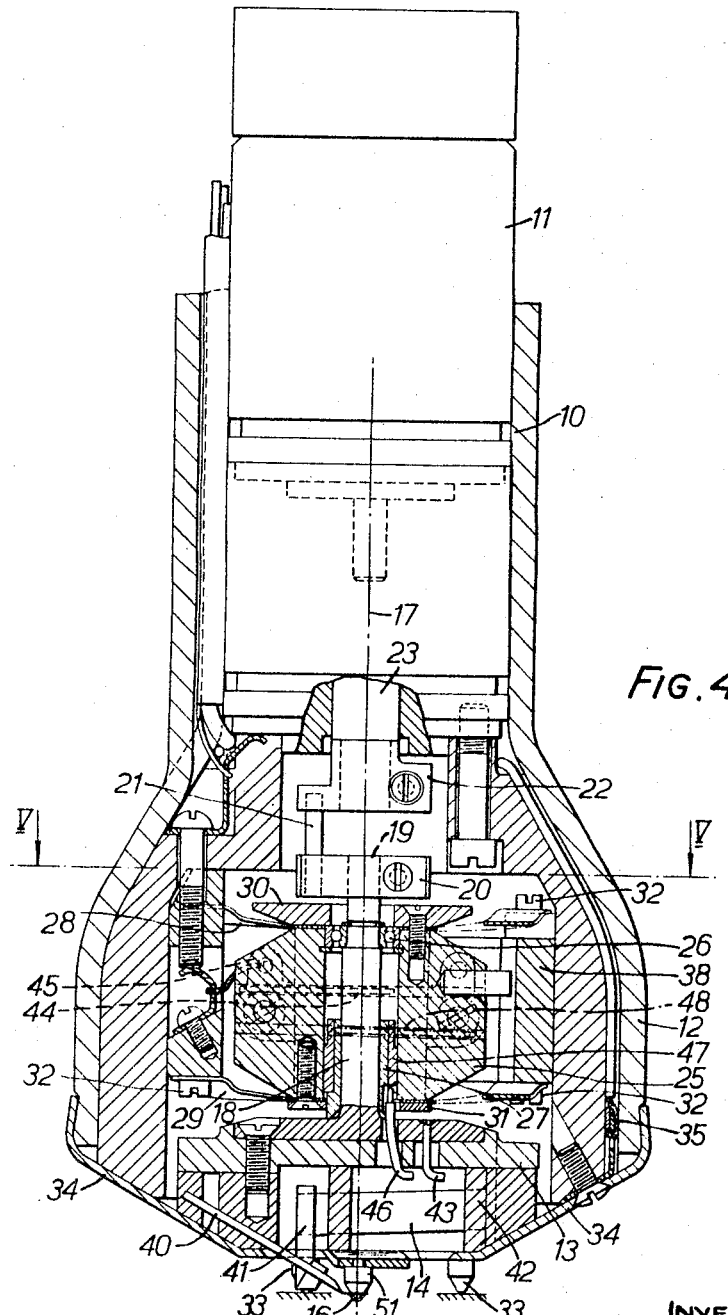
Figure 5:
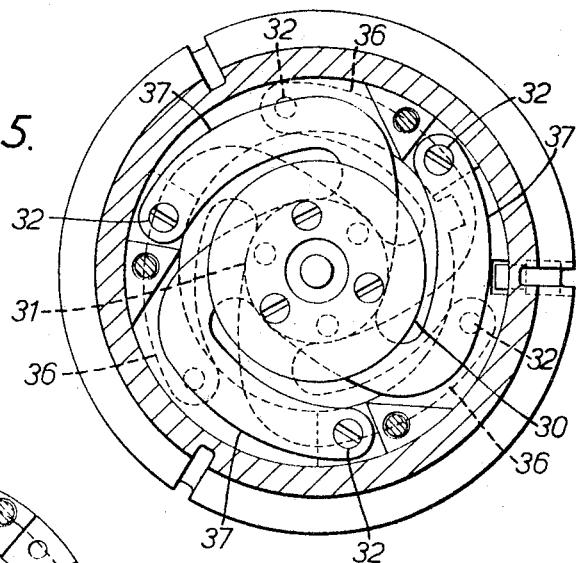
Figure 6:
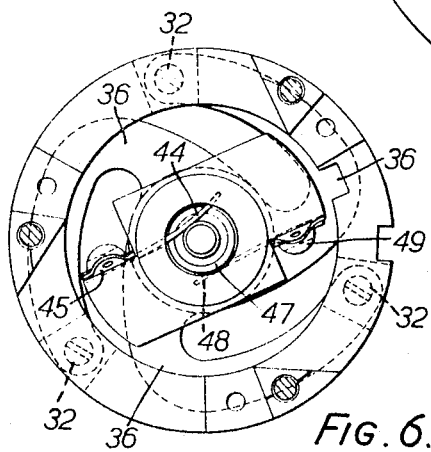
Figure 7:
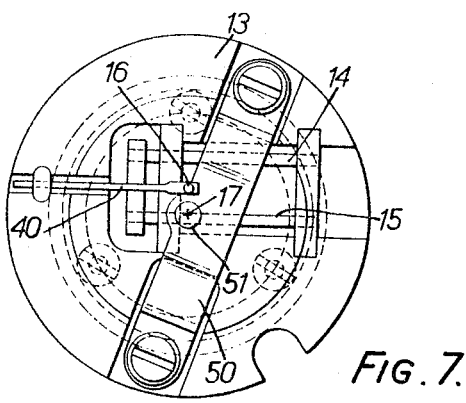
Figure 8:
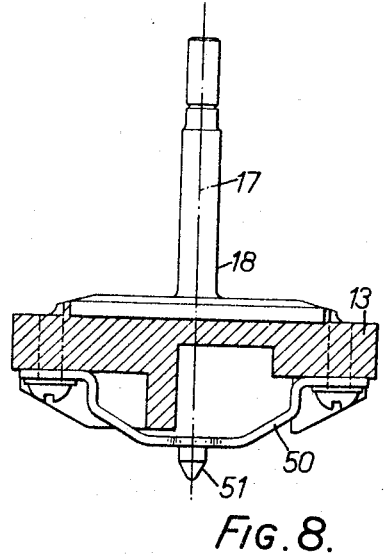

The invention may be performed in various ways and one specific embodiment will now be described by way of example with reference to the accompanying drawings in which:

FIGURE 1 is a block circuit diagram showing the essential parts of the electric circuitry of the apparatus, FIGURE 2 is a detailed circuit diagram showing details of the input circuit, amplifier, and integrator sections of the circuit shown in FIGURE 1, FIGURE 3 is a circuit diagram showing the motor control circuit of FIGURE 1, FIGURE 4 is a sectional side elevation through the head of the apparatus, with the relative disposition of some of the parts about the central axis rearranged for clarity, FIGURE 5 is a cross-sectional view on the line V—V in FIGURE 4 with the rotor assembly removed to show the two flexible spiders, FIGURE 6 is a cross-sectional view on the line V—V in FIGURE 4, with the upper spider removed to show the rotor assembly, FIGURE 7 is an underneath plan view of the rotary carrier member which supports the transducer, and FIGURE 8 is a side elevation partly in section through the rotary carrier member.

Referring first to FIGURES 4 to 8, the head illustrated comprises a main cylindrical casing 10 containing a small electric motor 11 at its upper end and having an enlarged bell housing 12 at its lower end. A rotary carrier member 13 is mounted within the housing and supports an electro-mechanical transducer in the form of two piezo-electric crystals 14, 15 which are connected to a stylus point 16 (in FIGURE 4 point 16 lies immediately in front of a pin 51) which is offset radially from the central axis 17 of the carrier member and of the motor 11 (as best seen in FIGURE 7). The radial displacement of the stylus point from the axis in this example is 0.25 cm. The carrier member 13 is secured to a spindle 18 which is mounted in a bearing assembly to be described hereinafter, the upper end 19 of the spindle being connected to a crank member 20 having a crank pin 21 which is slidably engaged in a second crank member 22 secured to the lower end of the shaft 23 which is connected to the output shaft of the motor 11.

The complete carrier member and spindle together with the transducers are movable vertically within limits, and for this purpose the spindle 18 is mounted in upper and lower bearings 26, 47 supported in vertically movable bearing housing 25. The upper bearing 26 is a ball type bearing which acts also as a thrust bearing locating the spindle axle in relation to the housing 25, and the lower bearing 47 is a cylindrical bush which acts to hold the spindle axis concentric with the housing axis, and also serves as an electrical slip ring as will be described below. The bearing housing 25 is resiliently movable in a direction parallel to the axis of the carrier member and to this end it is supported by flexible spiders 28, 29 at its upper and lower ends. Each spider is formed of resilient sheet metal with a central apertured portion which is secured to the adjacent end surface of the bearing housing 25 by means of a locating plate 30 or 31, and each spider has three cranked projecting arms 36, or 37, as best seen in FIGURES 5 and 6. Each arm extends radially outwards from the central part and then extends circumferentially through an arc of approximately 90° thus providing a substantial length which will accommodate axial movement of the housing member. The outer ends of the legs of the spiders are secured to a stationary part 38 of the casing by means of bolts 32.

In the natural position of the two spiders as shown in FIGURE 4 the central apertured parts lie somewhat below the outer fixed ends of the legs and in this position the stylus 16 lies somewhat below the level of three legs or registration pins 33 which are mounted on a cover plate assembly attached to the lower end of the main bell housing 12. Thus when the instrument is applied to a surface to be tested the stylus and carrier member together with the bearing housing 25 will be moved upwards against the resilient reaction of the two spiders and at the same time the crank 21 will slide within the crank member 22.

Each of the registration pins 33 is mounted on a triangular section 34 of a cover plate assembly protecting the lower end of the head, and each section 34 is electrically connected to a lead 35 of which one only is shown in FIGURE 4. These leads are connected into a circuit, to be described hereinafter, by which an automatic control circuit is established when all three registration pins 33 are in contact with a metallic surface under test.

The carrier member 13 is provided with means for supporting a flexible stylus arm 40 carrying the stylus needle 16 at its extremity, and at an intermediate point in the length of the arm there is connected an attachment member 41 by which the arm is connected to the two piezo-electric crystals 14, 15. The other ends of the crystals are mounted in a block 42 fixed to the carrier member. One terminal lead 43 from the crystals is connected directly to a flange on the spindle 18 of the carrier, and an upper part of this spindle acts as a slip ring and is contacted by a resilient metal strip 44 which acts as a brush and which is connected to an electric terminal connection 45. The other connection 46 from the piezo-electric crystals is connected to a conducting sleeve 47 which surrounds the insulating bush 27 and is therefore electrically insulated from the spindle 18. This sleeve 47 acts as a second slip ring and is contacted by a resilient metal strip 48 which also acts as a brush, and is connected to a second electric terminal 49 mounted on the bearing housing member 25.

The carrier member is also provided with a bridge piece 50 rigidly secured to the underside thereof and having a central pin or registration stud 51 mounted in line with the axis 17 of the carrier member. This central registration pin 51 comes in contact with the surface to be tested as the instrument is brought up to the surface, and when the registration pins 33 have made contact with the surface the pin 51 acts to establish a datum or means position for the carrier member in relation to the surface, and automatically adjusts for general curvature of the surface under test. The registration pins 33 define a registration triangle within which the stylus point 16 and registration stud 51 are positioned. When the motor 11 is energised to drive the carrier member 13 the stylus point 16 then rotates about the axis 17 in a small circle, and irregularities in the surface cause vibration of the stylus, and a corresponding electrical signal is generated by the piezo-electric crystals, this signal being amplified and fed to a meter, as will be described below, in order to provide an indication of the surface roughness.

The electrical circuits associated with the instrument as so far described are illustrated schematically in FIGURE 1. The output from the piezo-electric crystals 14, 15, is fed to a high input impedance circuit 60, which is followed by an amplifier section 61, and next by an integrator section 62, the output of which is fed to a meter 63. The meter can thus be calibrated directly in terms of surface roughness.

The power supply for sections 60–63 is obtained from a portable battery unit 64, which also supplies power to a logic circuit 65 controlling the power supply to the motor 11. The logic circuit is actuated by the circuits connected to the three registration pins 33 via leads 35; so that the motor circuit is completed only when all three pins are in contact with the surface under test, producing an electrical short circuit between the three leads 35.

The sections 60, 61, 62, 63 are illustrated in detail in FIGURE 2. The input circuit is a twin emitter follower incorporating two transistors 66, 67, with the input impedance so adjusted that the time constant of the circuit provides a low frequency cut-off equivalent to the frequency produced by a .03" undulation on the specimen when the motor 11 is driven by a 4.5 volt battery.

The amplifier 61 is a low gain feed back amplifier including transistor 68 feeding the integrator circuit 62 which has capacitative and resistive elements to give a leaky integrated signal at the meter 63.

The logic circuit 63, as shown in FIGURE 3, includes a diode "and" logic section 69, arranged to drive a switching transistor 70 only when all three leads 35 are short circuited, the transistor 70 being arranged to control the final output stage including transistor 71 in the circuit of the motor 11, and the motor lamp 72.

I claim:

1. Surface testing apparatus comprising a head including a rotary carrier member, an electro-mechanical transducer carried by the carrier member and having a stylus arranged to engage a surface under test, the stylus being offset from the axis of rotation of the carrier member, a registration member on the carrier member arranged to engage the surface and determine the position of the carrier member with respect thereto, driving means for moving the carrier member so that the transducer traverses the surface, three spaced registration members for engagement with the surface in a tripod-like manner and within which is positioned the registration member on the carrier member and the transducer, and indicating means responsive to the output of the transducer for indicating the degree of smoothness of the surface.

2. Surface testing apparatus as claimed in claim 1, in which the stylus is offset from the axis of rotation by not more than 1 cm.

3. Surface testing apparatus as claimed in claim 1, in which the stylus is offset from the axis of rotation by not more than .25 cm.

4. Surface testing apparatus comprising a head including a rotatable carrier member, a transducer carried by the carrier member and arranged to engage the surface under test at a position offset from the axis of rotation of the carrier member, a registration member on the carrier member arranged to engage the surface and determine the position of the carrier member with respect thereto, driving means for rotating the carrier member so that the transducer traverses the surface, three spaced registration members for engagement with the surface to define a registration triangle within which is positioned the registration member on the carrier member and the transducer, and indicating means responsive to the output of the transducer for indicating the degree of smoothness of the surface.

5. Surface testing apparatus comprising a head including a casing, three spaced registration members at one end of the casing for engagement with a surface under test in the manner of a tripod to determine the position of the casing with respect to the surface, a rotatable carrier member mounted in the casing for axial movement towards and away from the surface under test, an electro-mechanical transducer carried by the carrier member with a stylus which projects from said one end of the casing within the three registration members for engagement with the surface, a central registration member on the carrier member also projecting from said one end of the casing and arranged to engage the surface and determine the position of the carrier member with respect thereto, the central registration member being aligned with the rotational axis of the carrier member with respect to which axis the stylus is radially offset, driving means for rotating the carrier member so that the stylus traverses the surface around a circle centered on the central registration member, and indicating means responsive to the output of the transducer for indicating the degree of smoothness of the surface.

6. A head for surface testing apparatus comprising a casing, three spaced registration members at one end of the casing for engagement with a surface under test in the manner of a tripod to determine the position of the casing with respect to the surface, a rotatable carrier member mounted in the casing for axial movement towards and away from the surface under test, an electro-mechanical transducer carried by the carrier member with a stylus which projects from said one end of the casing for engagement with the surface within the three registration members, a central registration member on the carrier member also projecting from said one end of the casing and arranged to engage the surface and determine the position of the carrier member with respect thereto, the central registration member being aligned with the rotational axis of the carrier member with respect to which axis the stylus is radially offset, driving means for rotating the carrier member so that the stylus traverses the surface around a circle centered on the central registration member, and transducer output connections for connecting the head to indicating means responsive to the output of the transducer for indicating the degree of smoothness of the surface.

7. A surface testing head according to claim 6, wherein the stylus comprises a flexible stylus arm mounted on the carrier member with a free end projecting from said casing and an intermediate point on the arm connected to a piezo-electric crystal forming said transducer, and a stylus needle mounted at said free end of the stylus arm.

8. A surface testing head according to claim 6, wherein a brush and slip ring arrangement between the casing and carrier member connects the output connections to the transducer.

9. A surface testing head according to claim 6, wherein the carrier member is resiliently mounted on spiders which allow said axial movement of the carrier member and also urge that member towards said one end of the casing for engagement with the surface under test.

10. A surface testing head according to claim 6, wherein said driving means comprise an electric motor positioned within said casing at the other end thereof, and a coupling between the motor and the carrier member comprises a pin and crank arrangement which provides a self-aligning coupling allowing said axial movement of the carrier member relatively to the motor within the casing.

11. A surface testing head according to claim 6, wherein a cover plate at said one end of the casing is split into three portions which are mutually insulated in the electrical sense and on which said spaced registration members are respectively mounted, and the head has connections leading to such registration members and arranged for connection to a switching circuit which renders the head operative when the registration members make electrical connection with the surface under test.

References Cited by the Examiner
UNITED STATES PATENTS

| | | | |
|---|---|---|---|
| 2,728,222 | 12/1955 | Becker et al. | 73—105 |
| 3,087,329 | 4/1963 | Grodek et al. | 73—105 |
| 3,112,642 | 12/1963 | Harmon et al. | 73—105 |
| 3,208,272 | 9/1965 | Hall et al. | 73—105 |
| 3,254,530 | 7/1966 | Ohringer | 73—105 |

FOREIGN PATENTS 662,820   5/1963   Canada.

RICHARD C. QUEISSER, *Primary Examiner.*

J. C. GOLDSTEIN, *Assistant Examiner.*